US009163951B2

(12) United States Patent
Su et al.

(10) Patent No.: US 9,163,951 B2
(45) Date of Patent: *Oct. 20, 2015

(54) OPTIONAL RE-ROUTING

(71) Applicant: Microsoft Corporation, Redmond, WA (US)

(72) Inventors: Chien-Wen Danny Su, Ontario (CA); Aarti Bharathan, Sunnyvale, CA (US); Adrian Solis, Bellevue, WA (US); Jonathan Aroner, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/213,190

(22) Filed: Mar. 14, 2014

(65) Prior Publication Data

US 2014/0200802 A1 Jul. 17, 2014

Related U.S. Application Data

(63) Continuation of application No. 13/328,964, filed on Dec. 16, 2011, now Pat. No. 8,700,316.

(60) Provisional application No. 61/489,212, filed on May 23, 2011.

(51) Int. Cl.
*G01C 21/00* (2006.01)
*G01C 21/36* (2006.01)
*G01C 21/34* (2006.01)

(52) U.S. Cl.
CPC ........ *G01C 21/3605* (2013.01); *G01C 21/3415* (2013.01); *G01C 21/3626* (2013.01); *G01C 21/3629* (2013.01); *G01C 21/3697* (2013.01)

(58) Field of Classification Search
CPC .......... G01C 21/3415; G01C 21/3605; G01C 21/3697; G01C 21/3629; G01C 21/3626
USPC .......................... 701/416, 417, 411, 421, 300
See application file for complete search history.

(56) References Cited

U.S. PATENT DOCUMENTS

| 5,243,528 | A | 9/1993 | Lefebvre |
| 5,291,414 | A | 3/1994 | Tamai et al. |
| 5,303,159 | A | 4/1994 | Tamai et al. |
| 5,311,434 | A | 5/1994 | Tamai |
| 5,508,930 | A | 4/1996 | Smith, Jr. |
| 5,557,524 | A | 9/1996 | Maki |

(Continued)

OTHER PUBLICATIONS

Kirson, "A Compact Driver Interface for Navigation and Route Guidance," Proceedings of Vehicle Navigation and Information Systems Conference, 1995, In conjunction with the Pacific Rim TransTech Conference, 6th International VNIS. 'A Ride into the Future', pp. 61-66, Jul. 30-Aug. 2, 1995.

*Primary Examiner* — Gertrude Arthur Jeanglaude
(74) *Attorney, Agent, or Firm* — Aaron Chaterjee; Kate Drakos; Micky Minhas

(57) ABSTRACT

Disclosed herein are tools and techniques for providing optional re-routing. In one exemplary embodiment disclosed herein, a determination is made that a location of a computing device is not on a predetermined route between a start location and an end location. Based on the determining, a re-route option is provided. Also, while the re-route option is available, a determination is made that a subsequent location of the computing device is on the predetermined route, or a re-route is performed responsive to receiving a touch-anywhere input event on a touchscreen display.

20 Claims, 15 Drawing Sheets

(56) References Cited

U.S. PATENT DOCUMENTS

| | | | |
|---|---|---|---|
| 6,144,919 A * | 11/2000 | Ceylan et al. | 701/431 |
| 6,192,314 B1 * | 2/2001 | Khavakh et al. | 701/410 |
| 6,256,579 B1 | 7/2001 | Tanimoto | |
| 6,421,606 B1 * | 7/2002 | Asai et al. | 701/410 |
| 6,950,746 B2 * | 9/2005 | Yano et al. | 701/411 |
| 7,386,392 B1 | 6/2008 | Kabel | |
| 7,660,667 B2 | 2/2010 | Furukawa | |
| 7,957,895 B2 | 6/2011 | Haase | |
| 7,979,206 B2 | 7/2011 | Uyeki | |
| 2011/0191135 A1 | 8/2011 | Williams et al. | |
| 2012/0303264 A1 | 11/2012 | Su et al. | |

* cited by examiner

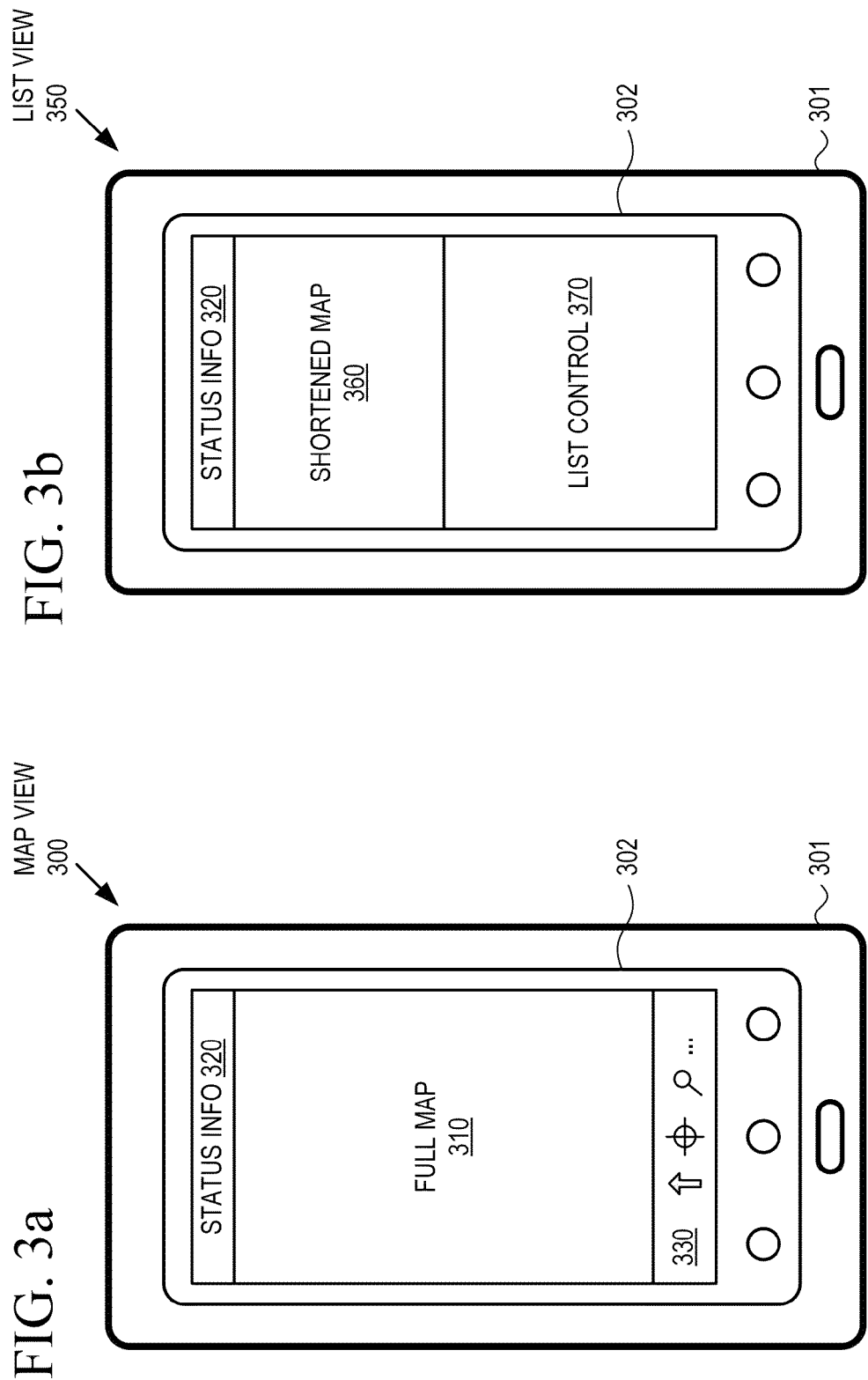

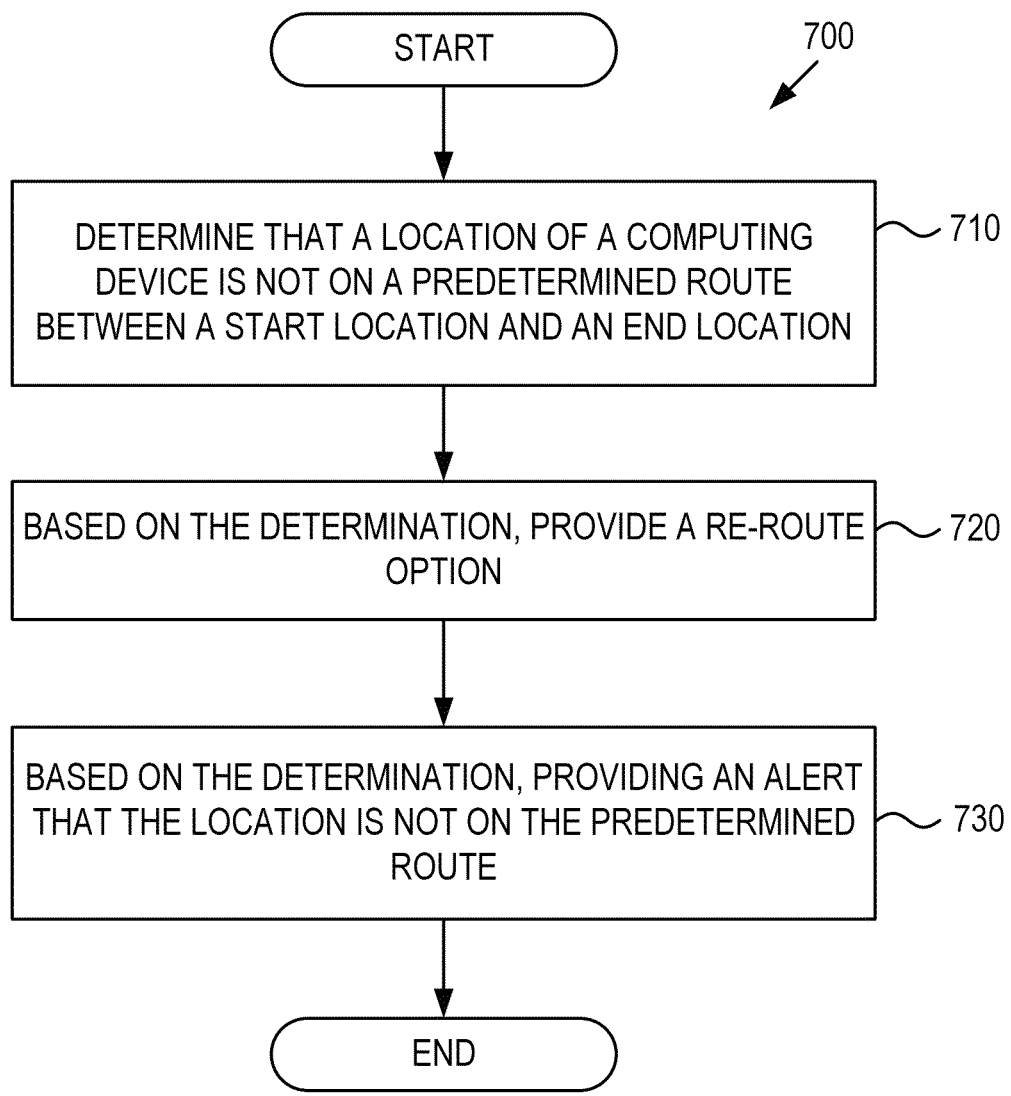

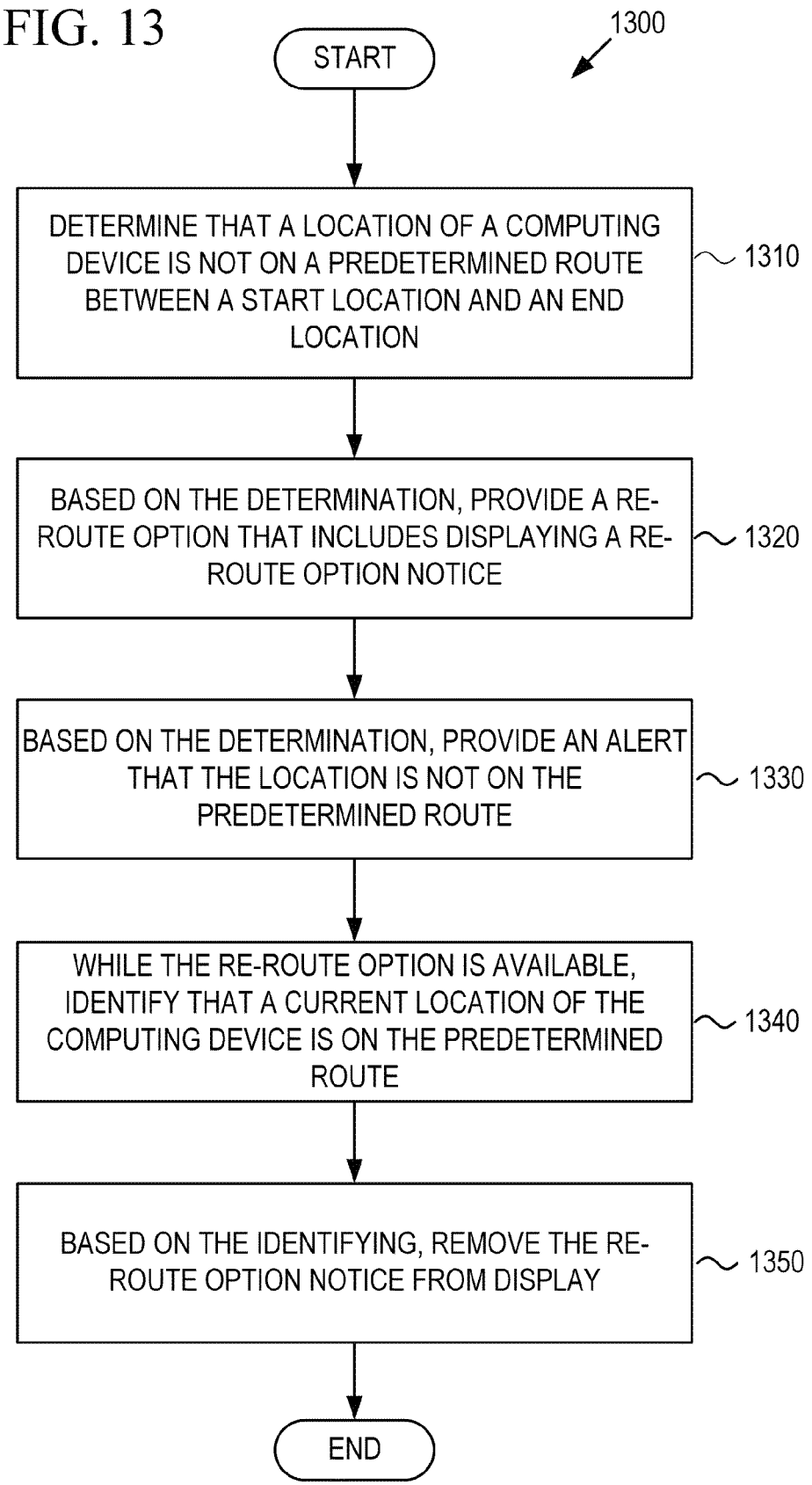

OPTIONAL RE-ROUTING

CROSS REFERENCE TO RELATED APPLICATION

This application is a continuation of Su et al., U.S. patent application Ser. No. 13/328,964, entitled "OPTIONAL RE-ROUTING," filed on Dec. 16, 2011, and claims the benefit of 61/489,212, filed May 23, 2011, all of which are hereby incorporated by reference herein.

BACKGROUND

Computer-aided map navigation tools have achieved widespread acceptance. A user can find an address or directions with map navigation tools available at various Web sites. Some software programs allow a user to navigate over a map, zooming in towards the ground or zooming out away from the ground, or moving between different geographical positions. In cars, GPS devices have provided rudimentary road navigation for years. More recently, map navigation software for cellular telephones and other mobile computing devices has allowed users to zoom in, zoom out, and move around a map that shows details about geographical features, town, city, county and state locations, roads, and buildings.

These computer-aided map navigation tools have become mobile and accessible to users while in motion. In recent times, these tools have allowed for the displaying of directions for navigation to a user provided destination. However, traditional routing techniques can be limited and inflexible.

SUMMARY

In summary, among other innovations, techniques and tools are described for providing optional re-routing. According to one aspect of the techniques and tools described herein, a determination is made that a location of a computing device is not on a predetermined route between a start location and an end location. Based on the determination, a re-route option is provided. Also, while the re-route option is available, a determination is made that a subsequent location of the computing device is on the predetermined route, or a re-route is performed responsive to receiving a touch-anywhere input event on a touchscreen display.

According to another aspect of the techniques and tools described herein, a determination is made that a location of a computing device is not on a predetermined route between a start location and an end location. Based on the determination, a re-route option is provided that includes a re-route option notice. Also based on the determination, an alert is provided that the location of the device is not on the predetermined route. While the re-route option is available, it is identified that a current location of the computing device is on the predetermined route. Based on identifying that the current location is on the predetermined route, the re-route option notice is removed from display.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The foregoing and other objects, features, and advantages of the invention will become more apparent from the following Detailed Description, which proceeds with reference to the accompanying figures.

BRIEF DESCRIPTION OF THE DRAWINGS

FIGS. 3a and 3b are diagrams illustrating features of a generalized map view and generalized list view rendered using a map navigation tool.

FIG. 7 is a flowchart of an exemplary method of alerting that a location is not on a predetermined route.

FIG. 13 is a flowchart of an exemplary method of removing a re-route option.

DETAILED DESCRIPTION

Often a user navigating using directions provided by a map navigation tool will deviate from the route determined by the directions. For example, the user may take a wrong turn or choose to deviate from the route for a detour or excursion. When the user deviates from the route, the user sometimes may want to be provided with a new route from their current location to the intended destination; however, sometimes the user may not want to be provided with a new route to the intended destination. Techniques and tools are described herein for optional re-routing.

Example Mobile Computing Device

Figure 1:
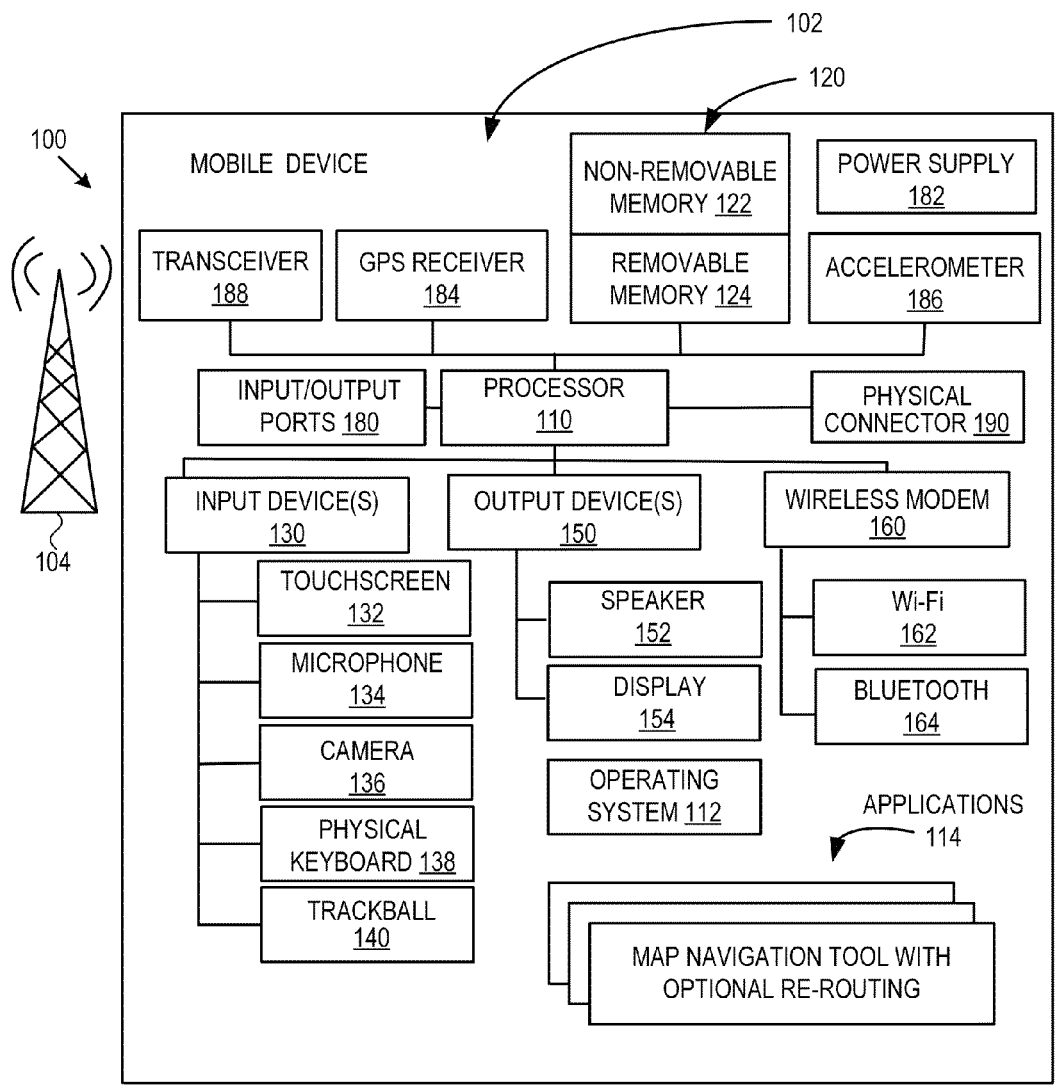
FIG. 1 is a block diagram illustrating an example mobile computing device in conjunction with which techniques and tools described herein may be implemented.

FIG. 1 depicts a detailed example of a mobile computing device (100) capable of implementing the techniques and solutions described herein. The mobile device (100) includes a variety of optional hardware and software components, shown generally at (102). In general, a component (102) in the mobile device can communicate with any other component of the device, although not all connections are shown, for ease of illustration. The mobile device can be any of a variety of computing devices (e.g., cell phone, smartphone, handheld computer, laptop computer, notebook computer, tablet device, netbook, media player, Personal Digital Assistant (PDA), camera, video camera, etc.) and can allow wireless two-way communications with one or more mobile communications networks (104), such as a Wi-Fi, cellular, or satellite network.

The illustrated mobile device (100) includes a controller or processor (110) (e.g., signal processor, microprocessor, ASIC, or other control and processing logic circuitry) for performing such tasks as signal coding, data processing, input/output processing, power control, and/or other functions. An operating system (112) controls the allocation and usage of the components (102) and support for one or more application programs (114) such as a map navigation tool that implements one or more of the innovative features described herein. In addition to map navigation software, the application programs can include common mobile computing applications (e.g., telephony applications, email applications, calendars, contact managers, web browsers, messaging applications), or any other computing application.

The illustrated mobile device (100) includes memory (120). Memory (120) can include non-removable memory (122) and/or removable memory (124). The non-removable memory (122) can include RAM, ROM, flash memory, a hard disk, or other well-known memory storage technologies. The removable memory (124) can include flash memory or a Subscriber Identity Module (SIM) card, which is well known in Global System for Mobile Communications (GSM) communication systems, or other well-known memory storage technologies, such as "smart cards." The memory (120) can be used for storing data and/or code for running the operating system (112) and the applications (114). Example data can include web pages, text, images, sound files, video data, or other data sets to be sent to and/or received from one or more network servers or other devices via one or more wired or wireless networks. The memory (120) can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device (100) can support one or more input devices (130), such as a touch screen (132) (e.g., capable of capturing finger tap inputs, finger gesture inputs, or keystroke inputs for a virtual keyboard or keypad), microphone (134) (e.g., capable of capturing voice input), camera (136) (e.g., capable of capturing still pictures and/or video images), physical keyboard (138), buttons and/or trackball (140) and one or more output devices (150), such as a speaker (152) and a display (154). Other possible output devices (not shown) can include piezoelectric or other haptic output devices. Some devices can serve more than one input/output function. For example, touchscreen (132) and display (154) can be combined in a single input/output device.

The mobile device (100) can provide one or more natural user interfaces (NUIs). For example, the operating system (112) or applications (114) can comprise speech-recognition software as part of a voice user interface that allows a user to operate the device (100) via voice commands. For example, a user's voice commands can be used to provide input to a map navigation tool.

A wireless modem (160) can be coupled to one or more antennas (not shown) and can support two-way communications between the processor (110) and external devices, as is well understood in the art. The modem (160) is shown generically and can include, for example, a cellular modem for communicating at long range with the mobile communication network (104), a Bluetooth-compatible modem (164), or a Wi-Fi-compatible modem (162) for communicating at short range with an external Bluetooth-equipped device or a local wireless data network or router. The wireless modem (160) is typically configured for communication with one or more cellular networks, such as a GSM network for data and voice communications within a single cellular network, between cellular networks, or between the mobile device and a public switched telephone network (PSTN).

The mobile device can further include at least one input/output port (180), a power supply (182), a satellite navigation system receiver (184), such as a Global Positioning System (GPS) receiver, sensors (186) such as an accelerometer, a gyroscope, or an infrared proximity sensor for detecting the orientation and motion of device (100), and for receiving gesture commands as input, a transceiver (188) (for wirelessly transmitting analog or digital signals) and/or a physical connector (190), which can be a USB port, IEEE 1394 (FireWire) port, and/or RS-232 port. The illustrated components (102) are not required or all-inclusive, as any of the components shown can be deleted and other components can be added.

The mobile device can determine location data that indicates the location of the mobile device based upon information received through the satellite navigation system receiver (184) (e.g., GPS receiver). Alternatively, the mobile device can determine location data that indicates location of the mobile device in another way. For example, the location of the mobile device can be determined by triangulation between cell towers of a cellular network. Or, the location of the mobile device can be determined based upon the known locations of Wi-Fi routers in the vicinity of the mobile device. The location data can be updated every second or on some other basis, depending on implementation and/or user settings. Regardless of the source of location data, the mobile device can provide the location data to map navigation tool for use in map navigation. For example, the map navigation tool periodically requests, or polls for, current location data through an interface exposed by the operating system (112) (which in turn may get updated location data from another component of the mobile device), or the operating system (112) pushes updated location data through a callback mechanism to any application (such as the map navigation tool) that has registered for such updates.

With the map navigation tool and/or other software or hardware components, the mobile device (100) implements the technologies described herein. For example, the processor (110) can update a map view and/or list view in reaction to user input and/or changes to the current location of the mobile device. As a client computing device, the mobile device (100) can send requests to a server computing device, and receive map images, distances, directions, other map data, search results or other data in return from the server computing device.

The mobile device (100) can be part of an implementation environment in which various types of services (e.g., computing services) are provided by a computing "cloud." For example, the cloud can comprise a collection of computing devices, which may be located centrally or distributed, that provide cloud-based services to various types of users and devices connected via a network such as the Internet. Some tasks (e.g., processing user input and presenting a user interface) can be performed on local computing devices (e.g., connected devices) while other tasks (e.g., storage of data to be used in subsequent processing) can be performed in the cloud.

Although FIG. 1 illustrates a mobile device (100), more generally, the techniques and solutions described herein can be implemented with devices having other screen capabilities and device form factors, such as a desktop computer, a television screen, or device connected to a television (e.g., a set-top box or gaming console). Services can be provided by the cloud through service providers or through other providers of online services. Thus, the map navigation techniques and solutions described herein can be implemented with any of the connected devices as a client computing device. Similarly, any of various computing devices in the cloud or a service provider can perform the role of server computing device and deliver map data or other data to the connected devices.

Example Software Architecture for Rendering of Map Data and Directions

Figure 2:
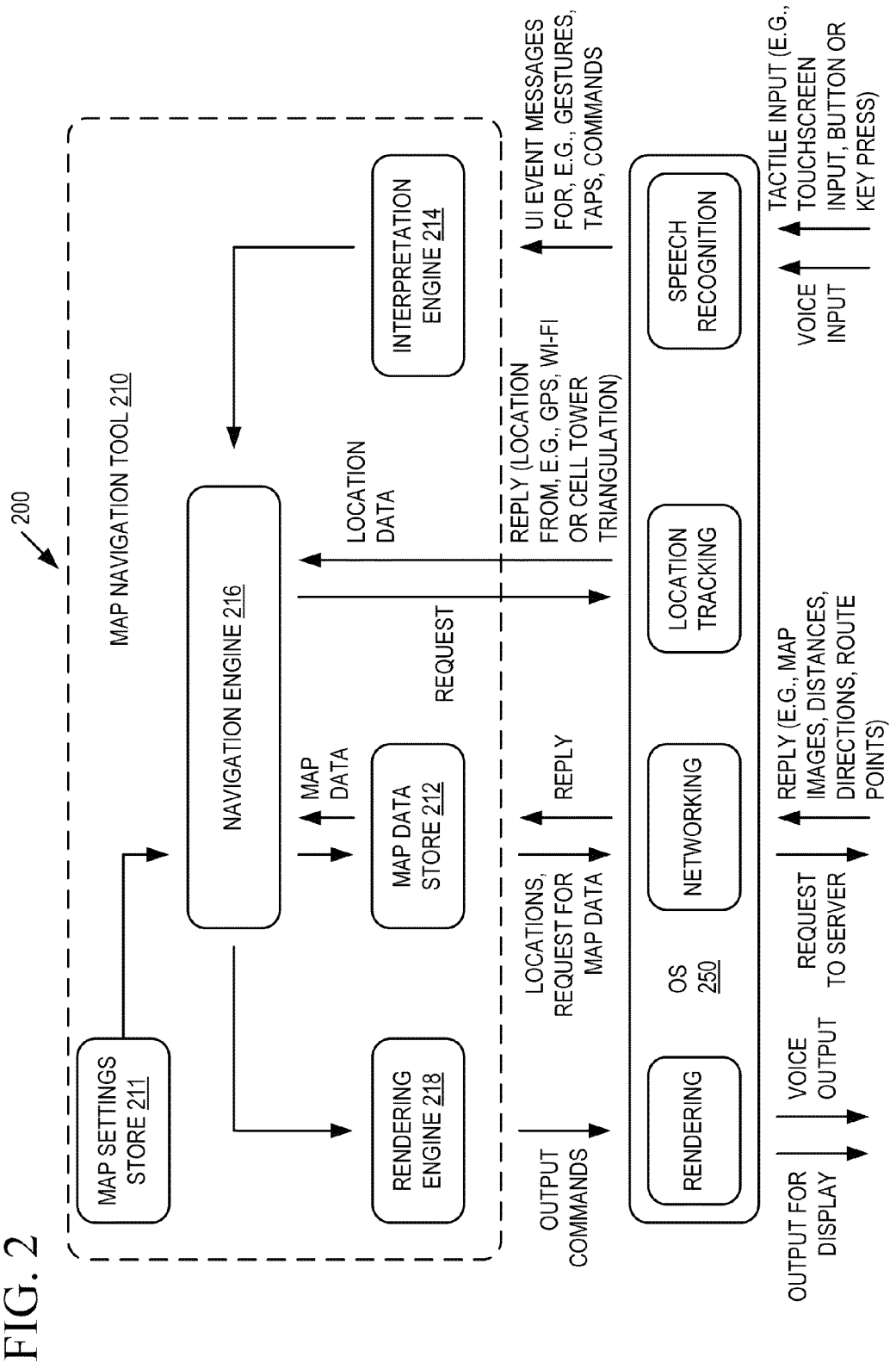
FIG. 2 is a block diagram illustrating an example software architecture for a map navigation tool that renders map views and list views.

FIG. 2 shows an example software architecture (200) for a map navigation tool (210) that renders views of a map depending on user input and location data. A client computing device (e.g., smart phone or other mobile computing device) can execute software organized according to the architecture (200) to render map views, list views of directions for a route, or other views.

The architecture (200) includes a device operating system (OS) (250) and map navigation tool (210). In FIG. 2, the device OS (250) includes components for rendering (e.g., rendering visual output to a display, generating voice output for a speaker), components for networking, components for location tracking, and components for speech recognition. The device OS (250) manages user input functions, output functions, storage access functions, network communication functions, and other functions for the device. The device OS (250) provides access to such functions to the map navigation tool (210).

A user can generate user input that affects map navigation. The user input can be tactile input such as touchscreen input, button presses or key presses or voice input. The device OS (250) includes functionality for recognizing taps, finger gestures, etc. to a touchscreen from tactile input, recognizing commands from voice input, button input or key press input, and creating messages that can be used by map navigation tool (210) or other software. The interpretation engine (214) of the map navigation tool (210) listens for user input event messages from the device OS (250). The UI event messages can indicate a panning gesture, flicking gesture, dragging gesture, or other gesture on a touchscreen of the device, a tap on the touchscreen, keystroke input, or other UI event (e.g., from voice input, directional buttons, trackball input). If appropriate, the interpretation engine (214) can translate the UI event messages from the OS (250) into map navigation messages sent to a navigation engine (216) of the map navigation tool (210).

The navigation engine (216) considers a current view position (possibly provided as a saved or last view position from the map settings store (211)), any messages from the interpretation engine (214) that indicate a desired change in view position, map data and location data. From this information, the navigation engine (216) determines a view position and provides the view position as well as location data and map data in the vicinity of the view position to the rendering engine (218). The location data can indicate a current location (of the computing device with the map navigation tool (210)) that aligns with the view position, or the view position can be offset from the current location.

The navigation engine (216) gets current location data for the computing device from the operating system (250), which gets the current location data from a local component of the computing device. For example, the location data can be determined based upon data from a global positioning system (GPS), by triangulation between towers of a cellular network, by reference to physical locations of Wi-Fi routers in the vicinity, or by another mechanism.

The navigation engine (216) gets map data for a map from a map data store (212). In general, the map data can be photographic image data or graphical data (for boundaries, roads, etc.) at various levels of detail, ranging from high-level depiction of states and cites, to medium-level depiction of neighborhoods and highways, to low-level depiction of streets and buildings. Aside from photographic data and graphical data, the map data can include graphical indicators such as icons or text labels for place names of states, cities, neighborhoods, streets, buildings, landmarks or other features in the map. Aside from names, the map data can include distances between features, route points (in terms of latitude and longitude) that define a route between start and end locations, text directions for decisions at waypoints along the route (e.g., turn at NE $148^{th}$), and distances between waypoints along the route. The map data can provide additional details for a given feature such as contact information (e.g., phone number, Web page, address), reviews, ratings, other commentary, menus, photos, advertising promotions, or information for games (e.g., geo-caching, geo-tagging). Links can be provided for Web pages, to launch a Web browser and navigate to information about the feature.

The organization of the map data depends on implementation. For example, in some implementations, different types of map data (photographic image data or graphical surface layer data, text labels, icons, etc.) are combined into a single layer of map data at a given level of detail. Up to a certain point, if the user zooms in (or zooms out), a tile of the map data at the given level of detail is simply stretched (or shrunk). If the user further zooms in (or zooms out), the tile of map data at the given level of detail is replaced with one or more other tiles at a higher (or lower) level of detail. In other implementations, different types of map data are organized in different overlays that are composited during rendering, but zooming in and out are generally handled in the same way, with overlapping layers stretched (or shrunk) to some degree, and then replaced with tiles at other layers.

The map data store (212) caches recently used map data. As needed, the map data store (212) gets additional or updated map data from local file storage or from network resources. The device OS (250) mediates access to the storage and network resources. The map data store (212) requests map data from storage or a network resource through the device OS (250), which processes the request, as necessary requests map data from a server and receives a reply, and provides the requested map data to the map data store (212).

For example, to determine directions for a route, the map navigation tool (210) provides a start location (typically, the current location of the computing device with the map navigation tool (210)) and an end location for a destination (e.g., an address or other specific location) as part of a request for map data to the OS (250). The device OS (250) conveys the request to one or more servers, which provide surface layer data, route points that define a route, text directions for decisions at waypoints along the route, distances between waypoints along the route, and/or other map data in reply. The device OS (250) in turn conveys the map data to the map navigation tool (210).

As another example, as a user travels along a route, the map navigation tool (210) gets additional map data from the map data store (212) for rendering. The map data store (212) may cache detailed map data for the vicinity of the current location, using such cached data to incrementally change the rendered views. The map navigation tool (210) can pre-fetch map data along the route, or part of the route. Thus, as the rendered map views are updated to account for changes to the current location, the map navigation tool (210) often updates the display without the delay of requesting/receiving new map data from a server. As needed, the map data store (212) requests additional map data to render views.

The rendering engine (218) processes the view position, location data and map data, and renders a view of the map. Depending on the use scenario, the rendering engine (218) can render map data from local storage, map data from a network server, or a combination of map data from local storage and map data from a network server. In general, the rendering engine (218) provides output commands for the rendered view to the device OS (250) for output on a display. The rendering engine (218) can also provide output commands to the device OS (250) for voice output over a speaker or headphones.

The exact operations performed as part of the rendering depend on implementation. In some implementations, for map rendering, the tool determines a field of view and identifies features of the map that are in the field of view. Then, for those features, the tool selects map data elements. This may include any and all of the map data elements for the identified features that are potentially visible in the field of view. Or, it may include a subset of those potentially visible map data elements which are relevant to the navigation scenario (e.g., directions, traffic). For a given route, the rendering engine (218) graphically connects route points along the route (e.g., with a highlighted color) to show the route and graphically indicates waypoints along the route. The tool composites the selected map data elements that are visible (e.g., not obscured by another feature or label) from the view position. Alternatively, the tool implements the rendering using acts in a different order, using additional acts, or using different acts.

In terms of overall behavior, the map navigation tool can react to changes in the location of the computing device and can also react to user input that indicates a change in view position, a change in the top item in a list of directions for a route, or other change. For example, in response to a finger gesture or button input that indicates a panning instruction on the map, or upon a change to a previous item or next item in a list of directions for a route, the map navigation tool can update the map with a simple, smooth animation that translates (shifts vertically and/or horizontally) the map. Similarly, as the location of the computing device changes, the map navigation tool can automatically update the map with a simple translation animation. (Or, the map navigation tool can automatically re-position and re-render an icon that indicates the location of the computing device as the location is updated.) If the change in location or view position is too large to be rendered effectively using a simple, smooth translation animation, the map navigation tool can dynamically zoom out from at first geographic position, shift vertically and/or horizontally to a second geographic position, then zoom in at the second geographic position. Such a dynamic zoom operation can happen, for example, when a phone is powered off then powered on at a new location, when the view position is re-centered to the current location of the device from far away, when the user quickly scrolls through items in a list of directions for a route, or when the user scrolls to a previous item or next item in the list of directions that is associated with a waypoint far from the current view position. The map navigation tool can also react to a change in the type of view (e.g., to switch from a map view to a list view, or vice versa), a change in details to be rendered (e.g., to show or hide traffic details).

Alternatively, the map navigation tool (210) includes more or fewer modules. A given module can be split into multiple modules, or different modules can be combined into a single layer. For example, the navigation engine can be split into multiple modules that control different aspects of navigation, or the navigation engine can be combined with the interpretation engine and/or the rendering engine. Functionality described with reference to one module (e.g., rendering functionality) can in some cases be implemented as part of another module.

Exemplary Map Navigation UI

Figure 4A:
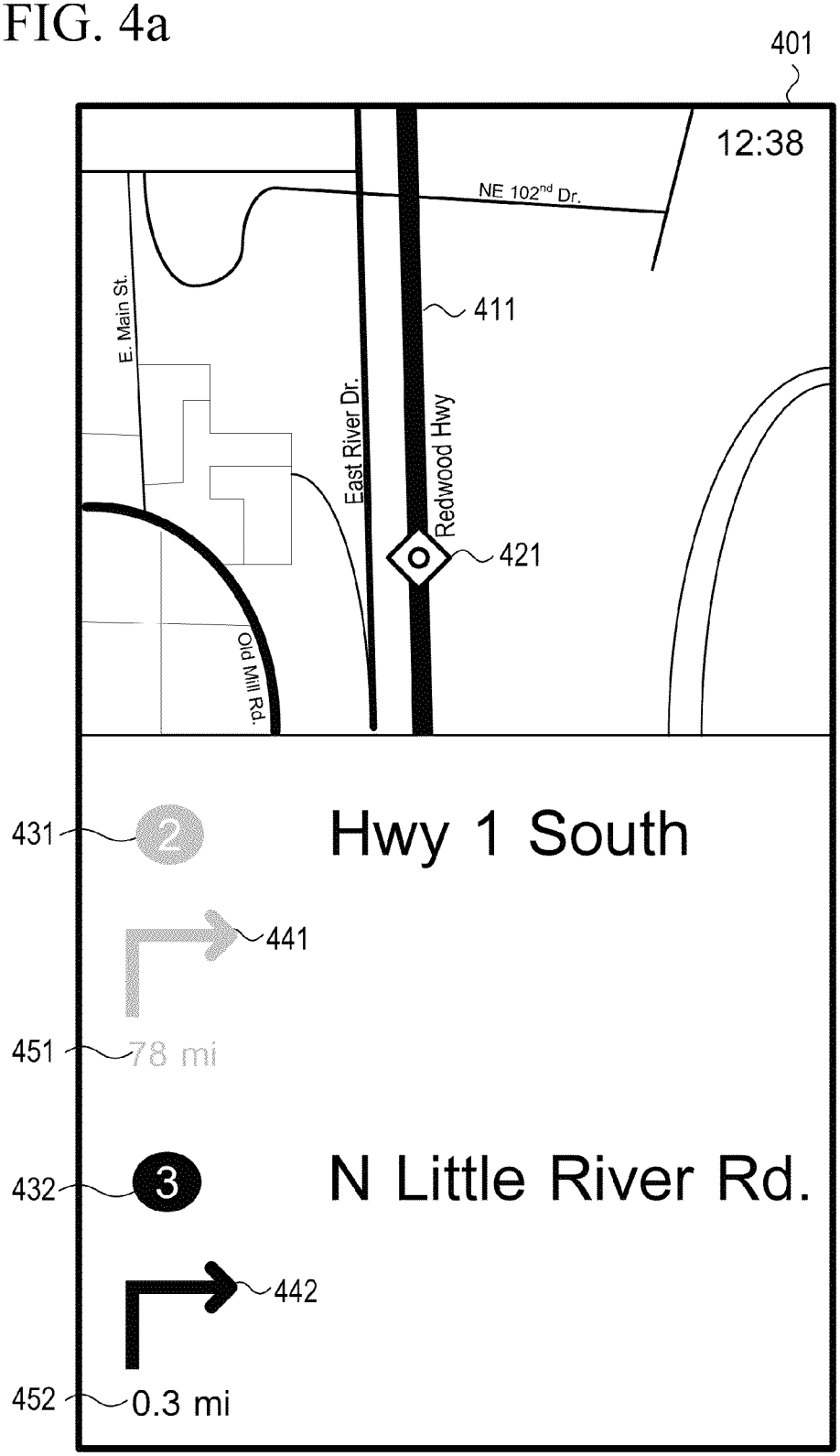
FIGS. 4a-4c are example screenshots illustrating user interface features of list views rendered using a map navigation tool.
Figure 4B:
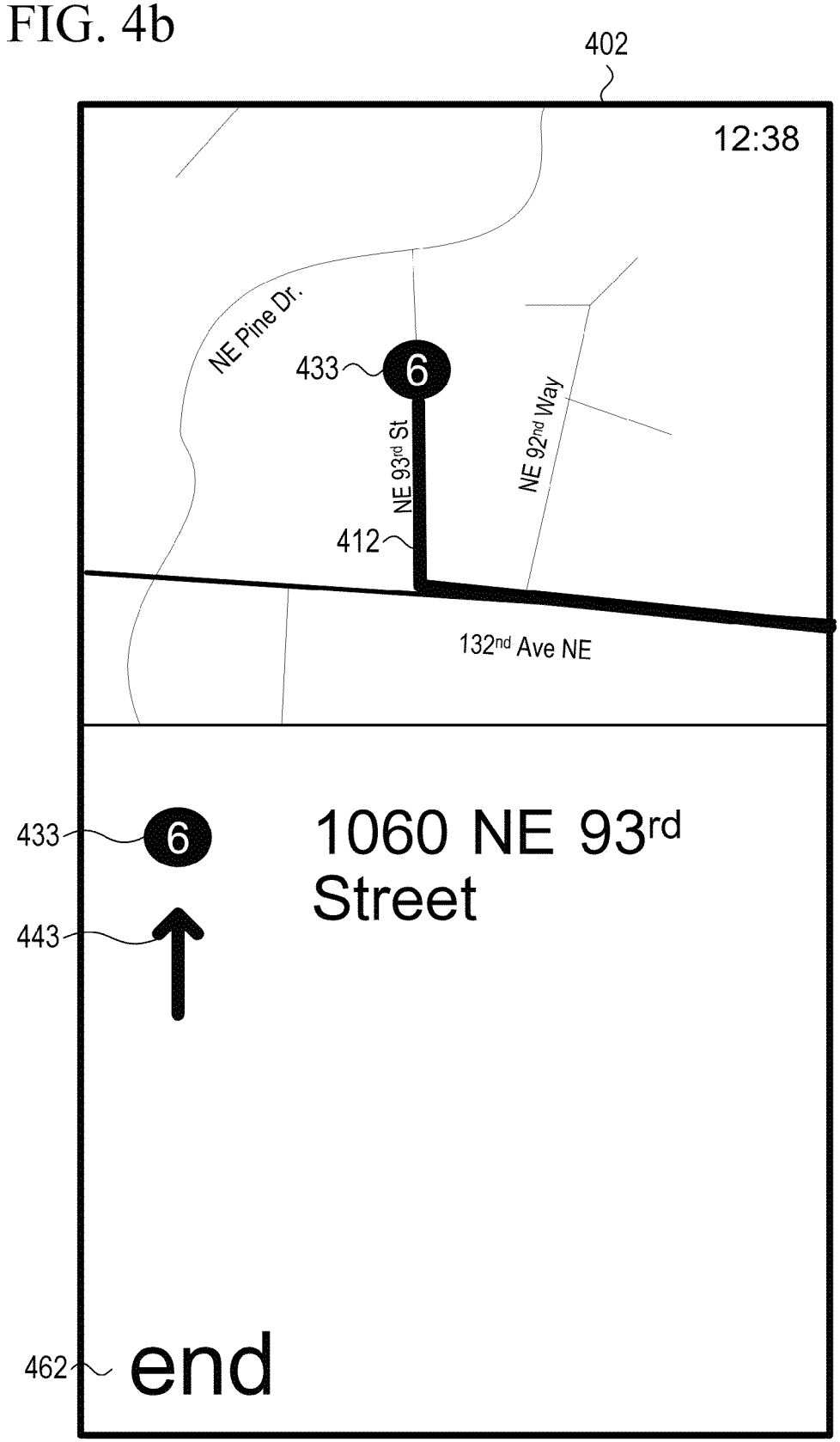
Figure 4C:

FIGS. 3a and 3b illustrate a generalized map view (300) and generalized direction list view (350), respectively, rendered using a map navigation tool of a mobile computing device (301). FIGS. 4a-4c show example screenshots (401, 402, 403) of a list view of a map navigation UI.

The device (301) includes one or more device buttons. FIGS. 3a and 3b show a single device button near the bottom of the device (301). The effect of actuating the device button depends on context. For example, actuation of the device button causes the device (301) to return to a home screen or start screen from the map navigation tool. Alternatively, the device (301) includes no device buttons.

The device (301) of FIGS. 3a and 3b includes a touchscreen (302) with a display area and three touchscreen buttons. The effect of actuating one of the touchscreen buttons depends on context and which button is actuated. For example, one of the touchscreen buttons is a search button, and actuation of the search button causes the device (301) to start a Web browser at a search page, start a search menu for contacts or start another search menu, depending on the point at which the search button is actuated. Or, one of the touchscreen buttons is a "back" button that can be used to navigate the user interface of the device. Alternatively, the device includes more touchscreen buttons, fewer touchscreen buttons or no touchscreen buttons. The functionality implemented with a physical device button can be implemented instead with a touchscreen button, or vice versa.

In the display area of the touchscreen (302), the device (301) renders views. In FIG. 3a, as part of the map view (300), the device (301) renders a full map (310) and status information (320) that overlays the top of the full map (310). The status information (320) can include time, date, network connection status and/or other information. The device (301) also renders a control section (330) that includes map navigation buttons, which depend on implementation of the map navigation tool. FIG. 3a shows a "directions" button (arrow icon), "re-center" button (crosshairs icon) and "search" button (magnifying glass icon). Actuation of the "directions" button causes the device (301) to open menu for keystroke input for a destination location. Actuation of the "center" button causes the device (301) to align the view position over the current location of the device (301). Actuation of the "search" button causes the device (301) to open menu for keystroke input for a search for a location or locations. Other buttons/controls can be accessed by actuating the ellipses, such as buttons/controls to clear the map of extra data, show/hide photographic image details, show/hide traffic data, show/hide route directions, change settings of the map navigation tool such as whether voice instructions are input or whether orientation of the view changes during progress along the route, etc. Alternatively, the device includes more map navigation buttons, fewer map navigation buttons or no map navigation buttons.

In FIG. 3b, as part of the list view (350), the device (301) renders a shortened map (360), status information (320) that overlays the top of the shortened map (360), and a list control (370). The shortened map (360) shows map details as in the full map (310) but also shows graphical details of at least part of a route between a start location and end location. The list control (370) shows text details and icons for directions along the route. FIGS. 4a-4c show example screenshots (401, 402, 403) of list views, each including a shortened map (360) and list control (370) as well as status information (320) (namely, time) that overlays the shortened map (360).

The screenshots (401, 402, 403) in FIGS. 4a-4c show different list views for a route between a start location and end location. In the screenshot (401) of FIG. 4a, a graphical icon (421) shows the current location along the route in the map portion of the list view. Part of the route (411) is shown in a highlighted color relative to the rest of the map data. The list control of the screenshot (401) includes waypoint icons (431, 432) and text details for waypoints along the route. Items in the list of directions are organized as waypoints, which represent points at which the user is given specific directions to turn, continue straight, take an exit, etc. Below the waypoint icons (431, 432), direction icons (441, 442) graphically represent the active part of the directions, e.g., to turn continue straight, take and exit associated with the respective waypoints. Distance values (451, 452) indicate the distance between waypoints (as in the distance (452) between waypoints 2 and 3) or distance between the current location and the upcoming waypoint (as in the distance (451) to waypoint 2).

The color of the waypoint icons (441, 442), text details, direction icons (441, 442) and distance values (451, 452) can change depending on the status of progress along the route. In FIG. 4a, the waypoint icon (431), text and direction icon (441) for waypoint 2 are rendered in an accent color to indicate waypoint 2 is the upcoming item in the list of directions. On the other hand, the waypoint icon (432), associated text and direction icon (442) for waypoint 3 are rendered in a neutral color to indicate waypoint 3 is further in the future.

The screenshot (402) of FIG. 4b shows the list view after the user scrolls to the end of the list of directions, which is graphically represented with text (462). Waypoint icons (433) represent a final waypoint in the map portion and list control of the list view. The map portion highlights part (412) of the route graphically. In the list control, the waypoint icon (433) is followed by text associated with the waypoint and a direction icon (443), but not a distance value since the waypoint is the final waypoint. The waypoint icon (433), associated text and direction icon (443) for the final, future waypoint are rendered in a neutral color.

The screenshot (403) of FIG. 4c shows the list view after the user scrolls back to the start of the list of directions, which is graphically represented with text (461). The map portion shows part (413) of the route graphically, but the completed part of the route is grayed out.

Waypoint icons (434) represent an initial waypoint in the map portion and list control of the list view, and are also grayed out to show that the initial waypoint has been passed. Another waypoint icon (435) represents a subsequent waypoint. In the list control, space permitting, the waypoint icons (434, 435) are followed by text associated with the waypoints and direction icons (444), also grayed out, but not distance value since the waypoints have been passed. The list control also includes transit mode icons (472) that the user can actuate to switch between modes of transit (e.g., walking, car, bus).

Exemplary Method for Providing a Re-route Option

Figure 5:
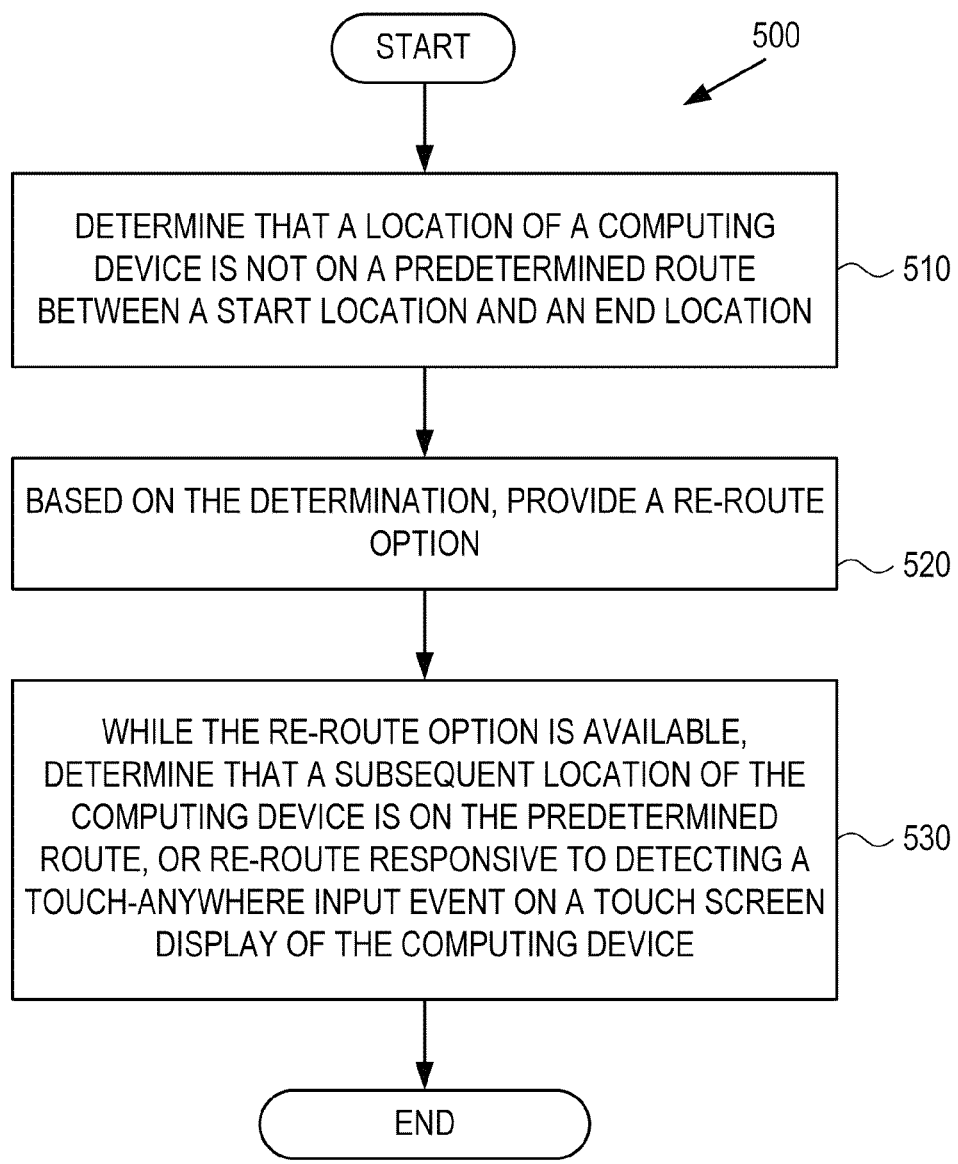
FIG. 5 is a flowchart of an exemplary method for providing a re-route option for re-routing or removal.

FIG. 5 is a flowchart of an exemplary method (500) for providing a re-route option. In the example, it is determined that the location of a computing device is not on a predetermined route between a start location and an end location at block (510). For example, a user driving an automobile that is carrying the computing device, that includes a map navigation tool, can take a detour from the predetermined route listed by the map navigation tool and upon a check, the computing device detects that the location of the computing device is not on the predetermined route.

At block (520) a re-route option is provided based on the determination that the location of the computing device is not on the predetermined route. For example, the computing device offers an option to the user for selection to recalculate a new route from the current location of the device to the end location or destination of the predetermined route.

At block (530) while the re-route option is available, a determination is made that a subsequent location of the computing device is on the predetermined route, or re-routing is performed responsive to receiving a touch-anywhere input event on the touchscreen display of the computing device.

For example, while the re-route option is available, if a touch-anywhere input event is received such that it is detected anywhere on the touch screen display, anywhere within the user interface, or anywhere within a predetermined location for selecting the option (e.g., within a predetermined area or pane), re-routing is performed responsive to detecting the touch-anywhere input event on the touchscreen display selecting the re-route option and a new route can be determined and displayed for the user. In one implementation, after the re-routing option is selected the re-routing option can be made unavailable and removed before the re-routing and/or before the new route is displayed for the user.

In another example, while the re-route option is available, a determination is made that a subsequent location of the computing device is on the predetermined route. For example, a determination is made that a checked subsequent location (e.g., a current location after the re-route option is provided and made available) of the device is on the predetermined route and that the computing device has returned to the predetermined route, and in response to the determination, the re-route option is removed automatically (e.g., removed without user input) and made unavailable. In some examples, a user of the device can perform a manual reroute where the user returns to the route manually after deviating from the route without being provided new directions, and the determination that the device, that is accompanying the user, has returned to the route can be detected. For example, a user driving a car can make a wrong turn deviating from the directions of the route, and then the user makes correcting turns to return to the route without receiving new directions to the route from the device. In some implementations, a re-route option is provided to the user while performing the manual reroute and the user does not select the re-routing option before returning to the route (e.g., the user ignores the re-route option). In one implementation, after the determination that the device has returned to the route, the re-route option can be removed automatically in response to the determination so that it is no longer available for selection, and the predetermined route can again be displayed for the user.

Exemplary System that Provides a Re-route Option

Figure 6:
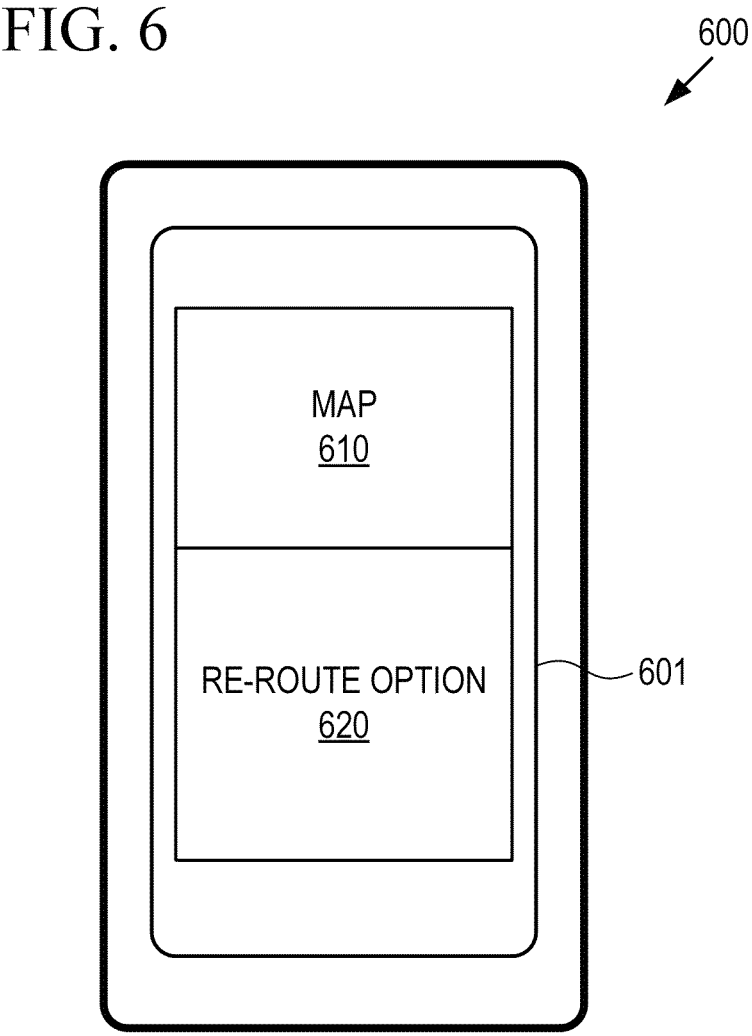
FIG. 6 is a schematic diagram of an exemplary computing device that provides a re-route option for re-routing or removal.

FIG. 6 is a schematic diagram of an exemplary computing device (600) with a map navigation tool that provides a re-route option. In the touchscreen display (601) of the computing device (600), a map (610) is displayed. Also, computing device (600) provides a re-route option 620. The re-route option is shown as displayed for illustrative purposes but the re-route option can be provided using other techniques notifying a user that the re-route option is available for selection such as using audio, vibration, text, a graphic, a shape, a button, or other technique. In some implementations, providing the re-route option can include displaying a re-route option notice. The re-route option notice can be text that is displayed by the computing device that indicates that the re-route option can be selected or activated. For example in one implementation of a re-route option, a re-route option notice can indicate that the computing device is off route and provide a prompt to perform a gesture (e.g., to perform a gesture anywhere) to refresh instructions. For example, the text prompt "You're off route. Tap anywhere to refresh instructions" can be displayed to the user. In another example implementation, the re-route option notice can be displayed above a list item in a list of directions displayed. In a further example implementation, the re-route option notice can be displayed between listed items in the list of directions between the start location and the end location. In other implementations, the re-route option notice can be displayed in a different location (e.g., any location) in the display of the computing device. In one implementation, an area of the display can be colored (e.g., colored red) to indicate that the computing device is off of the route and that the re-route option is available for selection. While the re-route option (620) is available, if a touch-anywhere input event on the touchscreen display of the computing device is detected, re-routing can be performed responsive to the detection. Additionally, while the re-route option (620) is available, if a determination is made by the device (e.g., by the map navigation tool or other component or tool included in the device) that a subsequent location of the computing device is on the predetermined route, the re-route option (620) can be removed automatically in response to the detection without further user action or input to the device.

Exemplary Method for Providing a Re-route Option

FIG. 7 is a flowchart of an exemplary method (700) of alerting that a location is off of a predetermined route. In the example, it is determined that the location of a computing device is not on a predetermined route between a start location and an end location. For example, a user of the device (e.g., a user carrying the device or traveling with the device in an automobile or other mode of transportation) can take a detour or leave the predetermined route and the device using the map navigation tool can determine that the current location of the device (e.g., the location of the device accompanying the user and/or mode of transportation) is not on the predetermined route. In one implementation, the computing device makes periodic checks (e.g. n checks per unit of time) to determine if the device is on the route. During a check, the device can determine a distance from the current location of the mobile device and a location on the route. The determined distance can be compared with a threshold distance set at a predetermined distance (e.g., m meters). If the distance exceeds the threshold distance, then the device can be determined to be off of the route, and if the distance does not exceed the threshold distance, then the device can be determined to be on the route. Using a threshold distance can account for imprecisions in GPS component information and the calculation of the location and distances.

In other implementations, the threshold distance can be an iterative threshold distance where the threshold distance is extended for the next iteration or check. For example, a first check is done and the threshold distance set at a first distance is exceeded, then the threshold can be extended to a greater distance for a subsequent check or checks (e.g., the next consecutive check, or another subsequent check). For example, when the threshold distance is extended one or more subsequent checks can be done to determine if the extended threshold is exceeded. In one implementation, a distance between the location of the computing device and the predetermined route is compared to the extended threshold distance, if the distance between the location and the route is greater than the threshold distance, then the extended distance is exceeded. In some implementations, the iterative threshold can be set at different distances for consecutive checks or iterations when a previous threshold is exceeded. In another example implementation, if the threshold or thresholds (e.g., one or more iterative thresholds) are exceeded a predetermined number of times (e.g., x times or multiple times) in consecutive checks, then it can be determined that the device is off the route. In some implementations, if the threshold is not exceeded and is an extended threshold, then the threshold distance can be set to a shorter distance such as a previous threshold distance or other shorter distance. In a further implementation, if the threshold or thresholds are not exceeded a predetermined number of times in consecutive checks then the device can be determined to be on the route. In yet further implementations, determining that a location of a computing device is off of a predetermined route can be done using other techniques.

With reference to FIG. 7, at block (720) a re-route option is provided based on the determination that the device is not on the predetermined route. For example, the user deviating from the predetermined route can be provided with an option to determine new directions from their current position or location to the destination location of the predetermined route. At block (730), an alert is provided that the location of the computing device is not on the route. For example, the user deviating from the predetermined route can be made aware that the current location of the device, that the user is moving with, is off of the route and that the re-route option to determine new directions is available for their selection. In some implementations, a re-route option can be provided if the route view is at (e.g., displaying) an upcoming turn or at a future or previous turn. In some implementations, for upcoming, future or previous turns, a re-route option notice can be inserted above the instruction text for the turn.

Exemplary Computing Device for Providing a Re-route Option

Figure 8B:
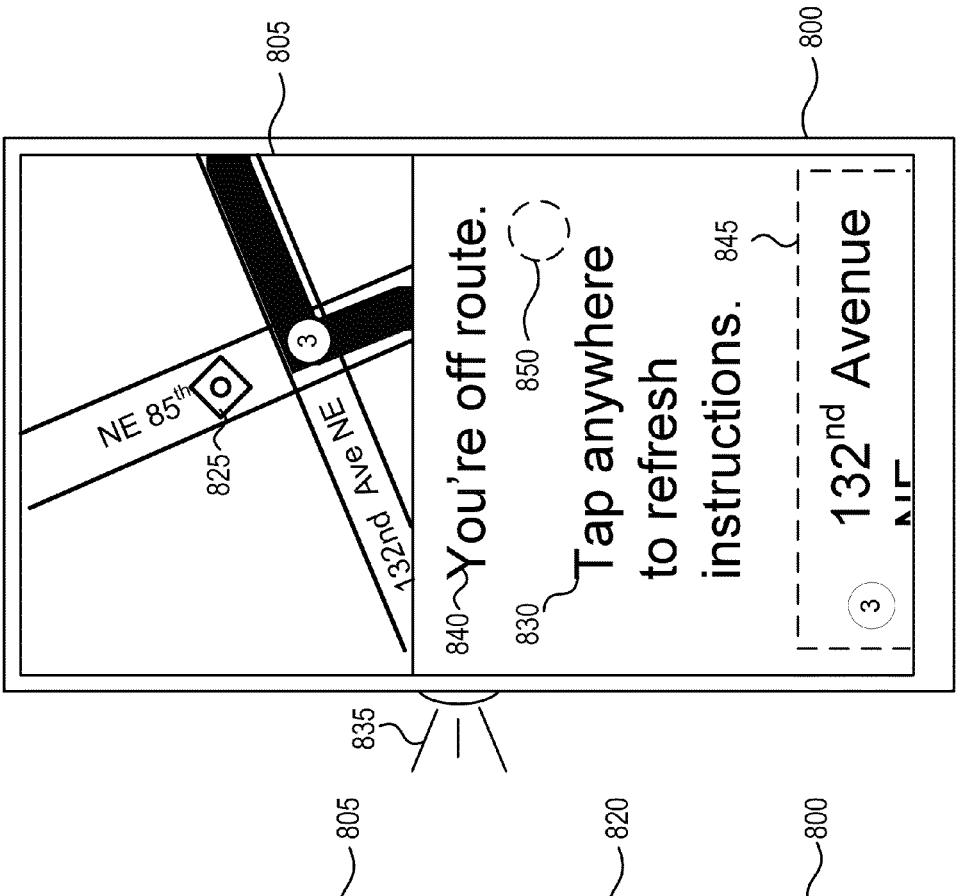
FIGS. 8a-8b illustrate a computing device that provides a re-route option.
Figure 8A:
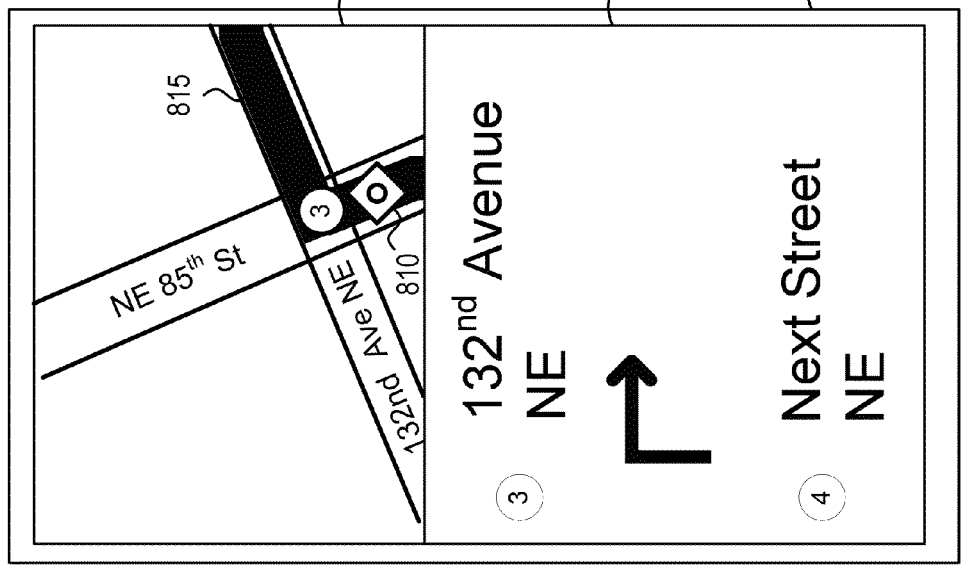

FIGS. 8a-8b illustrate a computing device (800) that provides a re-route option. In FIG. 8a the location of the computing device (800) is shown in the map (805) at graphical icon (810). The location of the computing device (800) is on a predetermined route illustrated by the list of directions (820) and the highlighted route (815) in map (805). In FIG. 8b, the computing device (800) is not on the predetermined route. The location of the computing device (800) is illustrated in the map (805) at graphical icon (825). When it is determined that the computing device is not on the predetermined route, a re-route option (830) is provided. The re-route option can be selected by a user. Also, when it is determined that the computing device is not on the predetermined route, an alert is provided indicating to the user that the location of the computing device is not on the predetermined route. The alert is an audio alert (835), a text alert (840), and de-emphasized list items (845). The dotted line of the de-emphasized list items (845) indicates that the list items have been de-emphasized. For example, for de-emphasis, the list items can be changed in color (e.g. grayed out), font, size, or position from how they were displayed before de-emphasis.

In other implementations, the alert can be a played recording of a speech announcement. For example, a recording can be played to the user that says "You've gone off route, tap to recalculate," or some other speech announcement. In another implementation, an audio cue can be used as the alert. For example, a recorded sound or music can be played to alert the user they have gone off route.

In a further implementation, the direction of the map displayed by the computing device can be used as the alert. For example, when the computing device's location is on the predetermined route the map can be oriented based on the direction of travel of the computing device (e.g., the direction of travel being toward the top of the display), and when the computing device's location is not on the predetermined route the map can stop orienting base on the direction of travel. When the map is not orienting based on the direction of travel, it can be in a static orientation (e.g. north being toward the top of the display) indicating that the computing device is not on the route.

In yet another implementation, the user can scroll up or down to see the list of de-emphasized directions for the route. Also a combination of alerts can be used. For example, an audio cue, a speech announcement, text, a map orientation, and other alerts can be used together or in subsets as the alert to the user. In some implementations, the alert and the reroute option notice can be provided above a list item (e.g. waypoint and associated text) when the list item is an upcoming, future or previous turn.

With reference to FIG. 8b, the re-route option is selected at location (850) of the computing device display. For example, a user taps the touchscreen display of the computing device at location (850) and the computing device detects the tap (e.g., a single tap) and receives it as a touch-anywhere input event selecting the re-route option. In other implementations, the re-route option can be selected using other techniques such as other gestures (e.g. a double tap, a press-and-hold, or a flick), a voice command, or the like.

Exemplary Method for Determining an Updated Route

Figure 9:
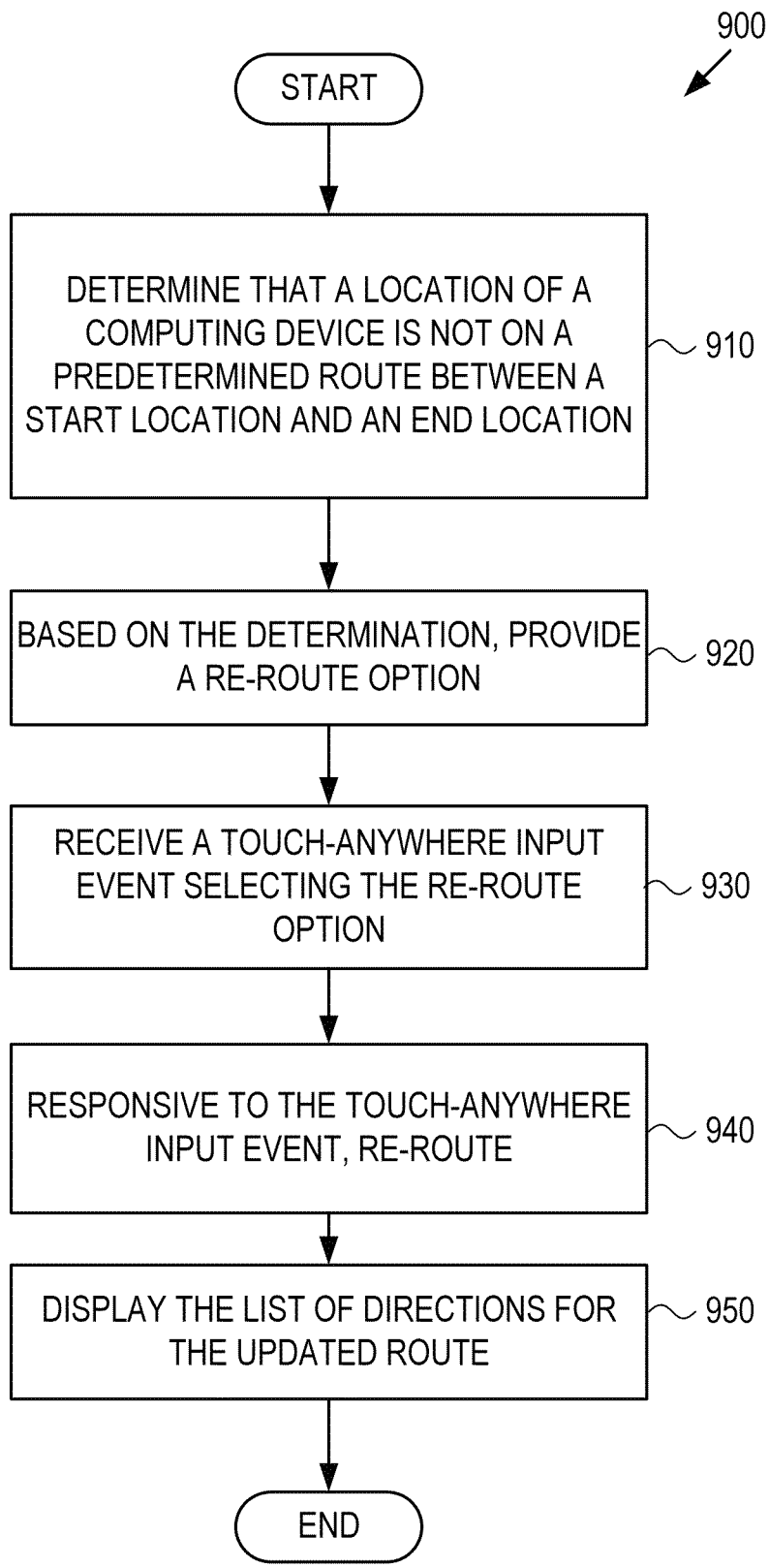
FIG. 9 is a flowchart of an exemplary method for determining an updated route.

FIG. 9 is a flowchart of an exemplary method (900) for determining an updated route. In the example, the location of a computing device is determined not to be on a predetermined route at block (910). At block (920), a re-route option is provided based on the determination that the location of the device is not on the predetermined route. At block (930), a touch-anywhere input event selecting the re-route option is received. For example, a user can choose to select the re-route option by performing a gesture (e.g., a single tap) on a touchscreen (e.g. anywhere on, at any location on, or a predetermined location on the touchscreen display) of the computing device while the re-routing option is available for selection, and the computing device can detect the gesture as an input event selecting the re-route option. In some implementations of a touch-anywhere input event, a predetermined location can include an area of the touch screen that allows for the selecting of the re-route option such as an area that includes a re-route option notice (e.g., a re-route option notice that indicates to perform a gesture anywhere to refresh instructions), an area that includes a list of directions (e.g., a list control), an area that includes a map, or another predetermined graphical area (e.g., a graphical button or list view). At block (940), re-routing is done responsive to receiving the touch-anywhere input event. For example, an updated route, indicated by a new list of directions, is determined from the current location of the device and the destination of the previous route. At block (950), the list of directions is displayed for the updated route.

Figure 10A:
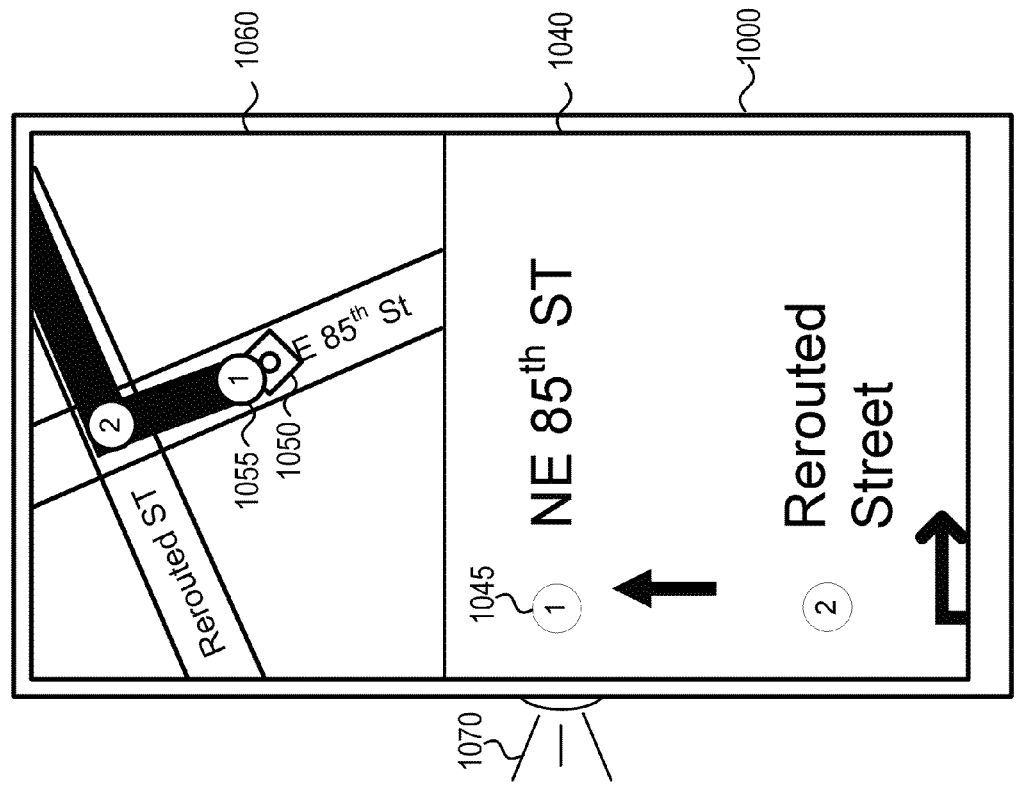
FIGS. 10a-10b illustrate a computing device that re-routes based on a selected re-route option.
Figure 10B:
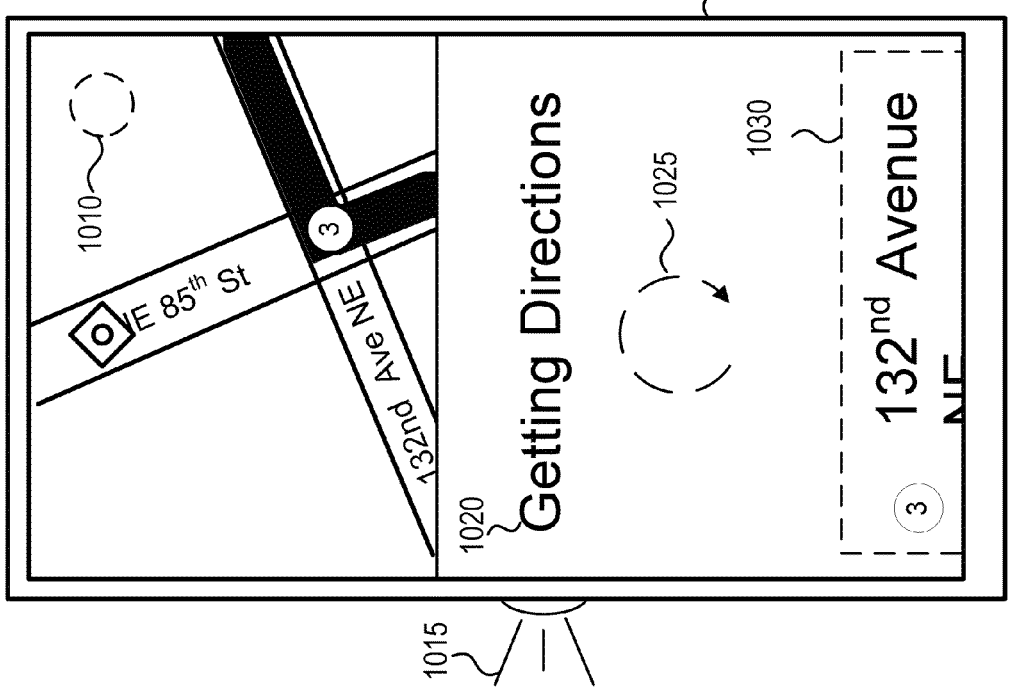

Exemplary Computing Device that Re-routes Based on a Selected Re-route Option FIGS. 10a-10b illustrate a computing device (1000) that re-routes based on a selected re-route option. In FIG. 10a, the computing device is shown re-routing responsive to receiving an input event such as touch-anywhere input event (1010) selecting a provided re-route option. During the re-routing, feedback is provided. The feedback includes an audio feedback (1015), and/or a displayed progress indicator such as progress indicator (1020). In some implementations the audio feedback can be a progress speech announcement. For example, a recording can be played that states "Recalculating route," "New directions obtained," or some other recorded speech message. In another implementation the audio feedback can be an audio progress indicator. For example, a recording (e.g., an audio file) can be played that provides an audio cue to the user that the route is being re-calculated. In one implementation of audio feedback, both a progress speech announcement and an audio progress indicator can be played. For example, the progress speech announcement can be played before or after the audio progress indicator.

In another implementation, the audio feedback can be looped. For example the audio feedback can be played more than one time during the re-routing to continue to give audio feedback throughout the re-routing process or a portion of the re-routing process. In one exemplary implementation, in a retrieving directions state, for example where it takes up to 40 seconds to get a location, the audio feedback can play a recording indicating that the route is recalculating and then play an audio progress indicator of twelve seconds for three loops. In a further implementation of audio feedback, audio feedback can be repeated based on a user input event received during re-routing. For example, audio feedback can be provided and once the feedback is finished the user taps the touchscreen of the computing device to replay the audio feedback. The re-routing process can include a determining a location state (e.g., where the current location is determined) and a retrieving directions state (e.g., where the route directions are retrieved).

Audio feedback of re-routing progress can be preferable to silence for a user waiting for new directions while in motion (e.g., while driving), because the re-routing can progress for a duration unknown to the user. In FIG. 10a, the displayed progress indicator is displayed until the new directions are obtained and displayed replacing the previous list of directions as shown in FIG. 10b. In other implementations the displayed progress indicator is displayed for some other duration and can be removed from display before the new directions are obtained. Additionally, the de-emphasized list items (1030) continue to be displayed as de-emphasized until the new directions are obtained and displayed. In other implementations, the list items can be removed from display or not displayed as de-emphasized.

The feedback illustrated in FIG. 10a also includes progress indicator (1020). Progress indicator (1020) is displayed text that indicates that directions are being retrieved. In other implementations, a progress indicator can be other text, a graphic such as graphic (1025), or other indicators such as moving text, shapes, graphics, or icons.

During the re-routing an updated set of direction instructions are retrieved. For example, when the user taps the touchscreen to select the re-routing option, the computing device determines a current location of the computing device and retrieves directions from the current location to the destination or end location of the previously determined route. The end location of the route can be included in the displayed or accessible predetermined list of directions (e.g. the last listed item or waypoint). In this example implementation, because the previously entered end location is available to the computing device and a current location can be determined, a new route can be generated between the end location and the current location. In other implementations, the end location can be entered by the user to provide the re-routing. For example, a user of the device can give a voice command to provide the end location such as giving the voice command "Get me to the nearest gas station," or some other voice command. In other implementations, the user can input the destination location using other techniques such as selection techniques (e.g., tapping on a location) or other input techniques.

In one exemplary implementation, re-routing can be performed responsive to receiving an input event from the user. For example, before the computing device determines that it is off of a predetermined route the user can decide to activate re-routing from a current location by performing an action such as a gesture (e.g., a press and hold, or other gesture) on the touchscreen, button press, or other like input event.

As shown in FIG. 10b the existing set of direction instructions, as shown by de-emphasized list items (1030) of FIG. 10a, are replaced once a new list of direction instructions (1040) are obtained and displayed during re-routing. The new list of direction instructions (1040) are ordered using a numbered order and the numbered order begins with the number one as show by the first list item (1045). The first listed item (1045) is associated with the location used as the current location of the computing device to determine the new list of directions as illustrated by the graphical icons (1050) and (1055) in the map (1060). For example, the current location can be the location where the device is located when the user taps the screen of the computing device or a location of the computing device when the location of the device is determined some duration after the re-routing option is selected. In some implementations, there can be a delay to determine the location of the computing device from the selection of the re-routing option. In other implementations, the list of directions can be organized in a different order and begin at a different number or not be numbered. At (1070) the first listed direction instruction is read aloud automatically. For example, audio is provided to the user giving the first listed direction instruction. In other implementations, a different instruction is read aloud or no instruction is read aloud.

Exemplary Method for Removing a Re-route Option

Figure 11:
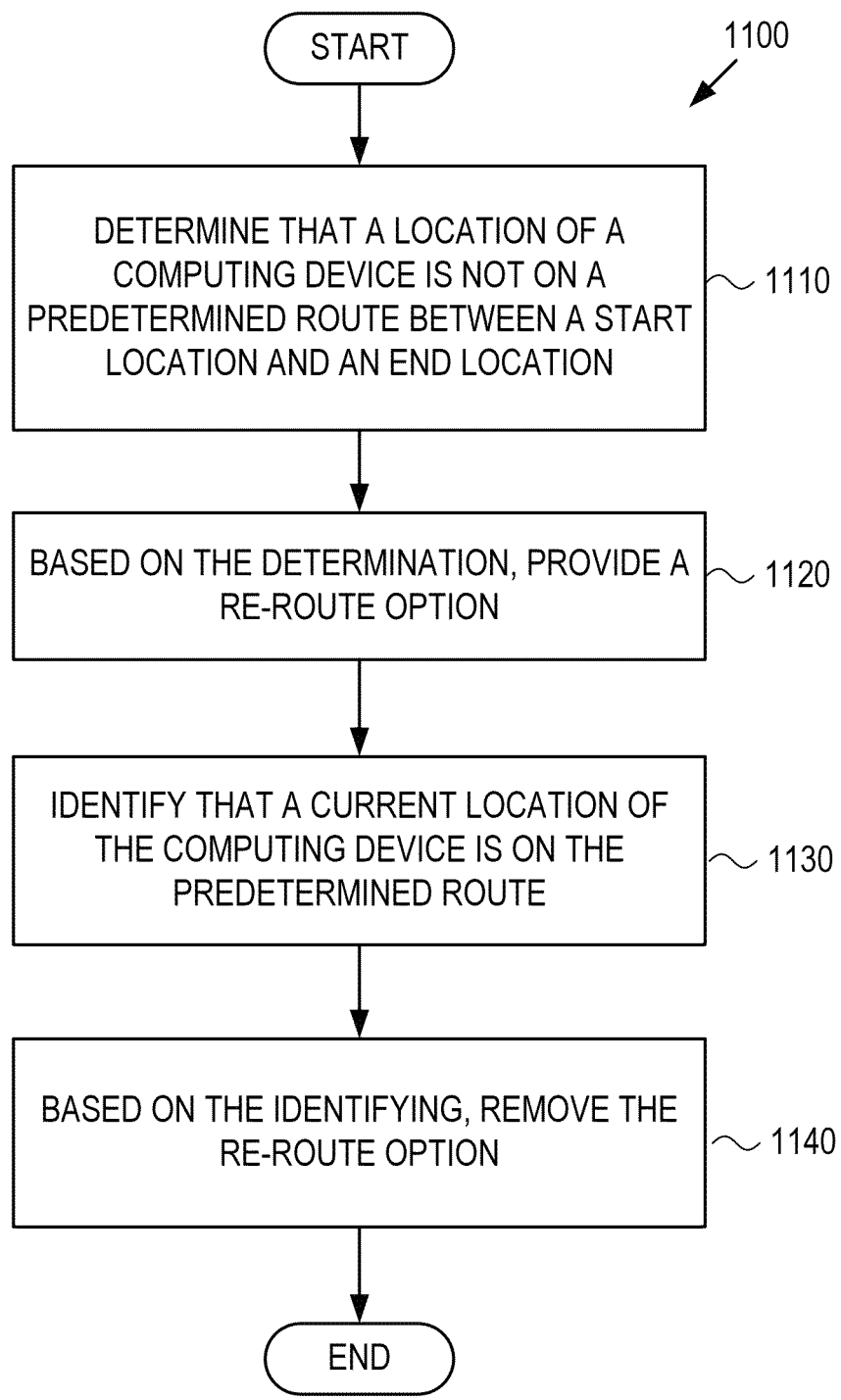
FIG. 11 is a flowchart of an exemplary method for removing a re-route option.

FIG. 11 is a flowchart of an exemplary method (1100) for removing a re-route option and can be used in combination with any of the other examples herein. In the example, a location of a computing device is determined not to be on a predetermined route at block (1100). At block (1120), a re-route option is provided based on the determination. At block (1120), while the re-route option is available, a current location of the computing device is identified to be on the predetermined route (e.g., after going off route). For example, the computing device using a map navigation tool can do a check to see if the computing device is within a threshold distance from a location on the predetermined route. At block (1120), the re-route option is removed and is no longer available for selection. In one implementation, the removing the re-route option can include removing a re-route option notice from the display of the computing device. In another implementation, where the re-route option is provided for selection using a voice command, the re-route option is removed such that the voice command cannot select the re-route option. For example, if a re-route option is provided for selection using a voice command, the re-route option can be removed such that when a user gives the voice command the re-route option is not selected or available for selection. In a further implementation where the re-route option is provided for selection using an enabled button, the re-route option is removed such that the button's functionality to select the re-route option is removed (e.g., disabled). For example, a button with functionality to select a re-route option can be disabled, so that when a user presses the button the re-route option is not selected or available for selection. In some implementations, when the re-route option is removed after a manual reroute, the distance and/or bearing is not updated, and/or the touchscreen display will display the screen that was displayed before the re-route option was provided. In an example where the manual reroute returns the device to the route at a location different than where it left the route, because the list of directions can be scrolled through, redisplaying the last shown screen of the directions list before the re-route option was provided can allow for the user to scroll to the directions corresponding to the new location of the device on the route. In other implementations, a different screen is displayed after a re-route option is removed after a manual reroute is detected.

Exemplary Computing Device that Removes a Re-route Option

Figure 12B:
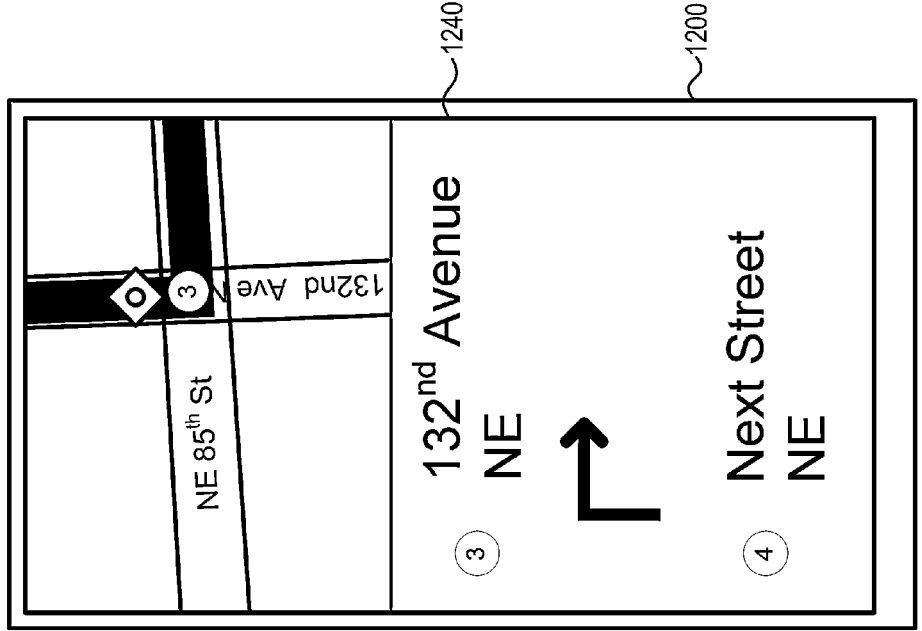
FIGS. 12a-12b illustrate a computing device that removes a re-route option based on a determination that the computing device is on a predetermined route.
Figure 12A:
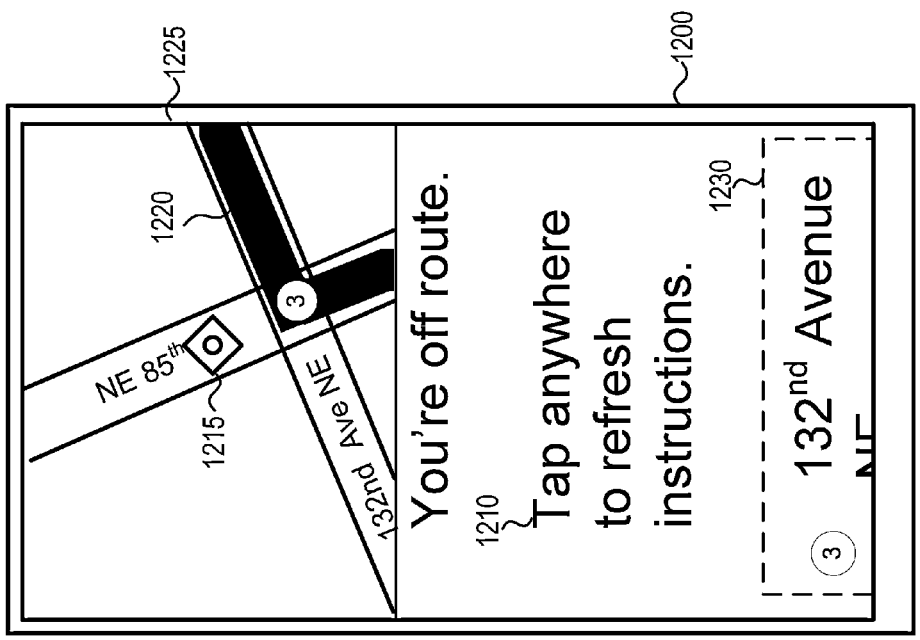

FIGS. 12a-12b illustrate a computing device (1200) that removes a re-route option based on a determination that the computing device is on (e.g., has returned to) a predetermined route. In FIG. 12a, the computing device provides a re-route option including re-route option notice (1210) to a user. For example, the user of the device goes off-route and the re-route option to determine a new route is provided to the user for selection. The location of the computing device (1200) is illustrated relative to the predetermined route by graphical icon (1215) and highlighted route (1220) in map (1225). The graphical icon (1215) indicates the location of the computing device (1200) and the highlighted route (1220) represents the predetermined route indicated by the list of directions that are de-emphasized as shown at (1230).

While the re-route option is available to the user for selection as shown in the example of FIG. 12a the computing device periodically checks to determine if the computing device is on the route. In the example of 12a, the computing device computes or determines a distance from the current position of the device to the route and if the distance is below a threshold value then the computing device determines that the device has returned and is on the route. In other implementations, determining that the device has returned to and is on the route can be determined using other techniques.

FIG. 12b illustrates the display of the computing device when the user does not select the re-routing option before returning to the predetermined route. While the re-route option is available to the user as shown in FIG. 12a, the location of the computing device is determined to be on the predetermined route indicated by the list of directions and the re-route option is removed and no longer available for selection by the user. Also, the re-route option notice (1210) of FIG. 12a is removed from the display and the display is as shown in FIG. 12b which shows a portion of the list of directions for the predetermined route. In other implementations, the off-route overlay including the re-route option that includes the re-route option notice (1210), off-route alerts, and the de-emphasis of the list of directions as shown in FIG. 12a is removed from display when it is determined that the computing device has returned to the route. In some implementations, the location on the route to where the computing device returns can be a location on the route previous to, the same as, or further along the route from the location the computing device deviated from the route.

In FIG. 12b, the predetermined list of directions (1240) are no longer de-emphasized and are available for the user as if the user had not been off of the route and had continued along the route. The predetermined list of directions (1240) is displayed in the list view that was displayed before the re-routing option was provided. In other implementations, the predetermined list of directions can be displayed in other list views such as at a previous or future list item or scrolled to a different position in the list of directions. Also in other implementations, displayed distances and bearings are not updated and can be displayed as before the re-routing option was provided. In some implementations, the list of direction instructions and/or the list views and information can be updated or modified when the re-route option and the off-route overlay are removed.

Exemplary Method for Removing a Re-route Option

FIG. 13 is a flowchart of an exemplary method (1300) of removing a re-route option. In the example, a location of a computing device is determined not to be on a predetermined route at block (1310). At block (1320), a re-route option that includes displaying a re-route option notice is provided based on the determination that the device is off of the route. At block (1330), an alert is provided that the location of the device is not on the predetermined route. At block (1340), a current location of the device is identified as being on the predetermined route while the re-route option is available for selection by the user. At block (1350), the re-route option is removed and the re-route option notice is removed from the device display based on the current location of the device being identified as being on the route.

Alternatives and Variations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media (e.g., non-transitory computer-readable media, such as one or more optical media discs such as DVD or CD, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

The disclosed methods, apparatus, and systems should not be construed as limiting in any way. Instead, the present disclosure is directed toward all novel and non-obvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved. In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. In a computing device that implements a map navigation tool, a method comprising:
   determining that a location of the computing device is not on a predetermined route between a start location and an end location;
   based on the determining, providing a re-route option; and
   while the re-route option is available:
      receiving a touch-anywhere input event on a touch-screen display of the computing device; and
      responsive to receiving the touch-anywhere input event, re-routing comprising determining an updated route from a current location of the computing device to the end location.

2. The method of claim 1, wherein providing the re-route option comprises: displaying a re-route option notice.

3. The method of claim 1, wherein providing the re-route option comprises:
   presenting an audio alert that a tap can be used to recalculate a new route.

4. The method of claim 1, wherein the re-routing further comprises retrieving a list of directions from the current location of the computing device to the end location, the list of directions indicating the updated route; and
   displaying the list of directions.

5. The method of claim 4, wherein the list of directions is in an order, the order beginning with a first list item associated with the current location; and providing an audio announcement of the first list item.

6. The method of claim 1, wherein the determining that the location of the computing device is not on the predetermined route comprises:

calculating a distance between the location and the predetermined route;

comparing the distance with a threshold distance; and determining that the threshold distance has been exceeded.

7. The method of claim 1 further comprising, based on the determining that the location of the computing device is not on the predetermined route, providing an alert that the location is not on the predetermined route, the alert comprising an off-route audio cue, an off-route speech announcement, displayed text, a map orientation, or a de-emphasized list item.

8. The method of claim 1, further comprising providing feedback during the re-routing, the feedback comprising an audio progress indicator, a progress speech announcement, or a displayed progress indicator.

9. The method of claim 8 further comprising, receiving a user input event during the re-routing; and responsive to the user input event, repeating the feedback.

10. The method of claim 9 wherein the user input event comprises a tap.

11. The method of claim 1, wherein the location of the computing device is a second location of the computing device, and wherein the determining that the second location of the computing device is not on the predetermined route comprises:

comparing a threshold distance with a first distance between a first location of the computing device and the predetermined route;

determining that the threshold distance has been exceeded;

based on the determining that the threshold distance has been exceeded, extending the threshold distance to an extended threshold distance;

comparing the extended threshold distance with a second distance between the second location and the predetermined route; and determining that the extended threshold distance has been exceeded.

12. A computing device that includes a processor, memory and storage media, the storage media storing computer-executable instructions for causing the computing device to perform a method, the method comprising:

determining that a location of the computing device is not on a predetermined route between a start location and an end location;

based on the determining, providing a re-route option; and while the re-route option is available:

receiving a touch-anywhere input event on a touchscreen display of the computing device; and responsive to receiving the touch-anywhere input event, re-routing comprising determining an updated route from a current location of the computing device to the end location.

13. The computing device of claim 12, wherein providing the re-route option comprises:

displaying a re-route option notice.

14. The computing device of claim 12, wherein providing the re-route option comprises:

presenting an audio alert that a tap can be used to recalculate a new route.

15. The computing device of claim 12, wherein the re-routing further comprises retrieving a list of directions from the current location of the computing device to the end location, the list of directions indicating the updated route; and displaying the list of directions.

16. The computing device of claim 12, wherein the determining that the location of the computing device is not on the predetermined route comprises:

calculating a distance between the location and the predetermined route;

comparing the distance with a threshold distance; and determining that the threshold distance has been exceeded.

17. The computing device of claim 12, wherein the method further comprises:

based on the determining that the location of the computing device is not on the predetermined route, providing an alert that the location is not on the predetermined route, the alert comprising an off-route audio cue, an off-route speech announcement, displayed text, a map orientation, or recolored directions.

18. The computing device of claim 12, wherein the location of the computing device is a second location of the computing device, and the determining that the second location of the computing device is not on the predetermined route comprises:

comparing a threshold distance with a first distance between a first location of the computing device and the predetermined route;

determining that the threshold distance has been exceeded;

based on the determining that the threshold distance has been exceeded, extending the threshold distance to an extended threshold distance;

comparing the extended threshold distance with a second distance between the second location and the predetermined route; and determining that the extended threshold distance has been exceeded.

19. The computing device of claim 18, wherein a first check comprises the determining that the threshold distance has been exceeded, and a consecutive check comprises the determining that the extended threshold distance has been exceeded.

20. One or more computer-readable storage media storing computer-executable instructions for causing a computing device to perform a method, the method comprising:

determining that a location of the computing device is not on a predetermined route between a start location and an end location;

based on the determining, providing a re-route option, the providing the re-route option comprising displaying a re-route option notice in a list of directions for the predetermined route and presenting an audio alert that a tap can be used to recalculate a new route;

also based on the determining, providing an alert that the location is not on the predetermined route, the alert comprising an off-route audio cue, an off-route speech announcement, displayed text, a map orientation, or a de-emphasized list item;

while the re-route option is available, receiving a tap input event on a touchscreen display of the computing device; and responsive to receiving the tap input event on the touchscreen display of the computing device, re-routing, wherein the re-routing comprises recalculating a new route from a current location of the computing device.

\* \* \* \* \*